United States Patent [19]

Schaub

[11] Patent Number: 5,077,029
[45] Date of Patent: Dec. 31, 1991

[54] MEMBRANE/DEOXO CONTROL METHOD AND SYSTEM

[75] Inventor: Herbert R. Schaub, East Amherst, N.Y.

[73] Assignee: Union Carbide Industrial Gases Technology Corporation, Danbury, Conn.

[21] Appl. No.: 556,835

[22] Filed: Jul. 23, 1990

[51] Int. Cl.$^5$ .................... C01B 21/00; G05D 7/00
[52] U.S. Cl. ................... 423/351; 422/110; 422/111; 422/189; 423/DIG. 5
[58] Field of Search .......... 423/351, DIG. 5; 422/110, 111, 189

[56] References Cited

U.S. PATENT DOCUMENTS

| 2,826,480 | 3/1958 | Webster | 423/351 |
|---|---|---|---|
| 3,339,341 | 9/1967 | Maxwell et al. | 55/16 |
| 4,238,204 | 12/1980 | Perry | 55/16 |
| 4,367,135 | 1/1983 | Posey, Jr. | 208/108 |
| 4,387,422 | 6/1983 | Steutermann | 422/110 |
| 4,543,637 | 9/1985 | Smith et al. | 422/111 |
| 4,595,405 | 6/1986 | Agrawal et al. | 62/18 |
| 4,645,516 | 2/1987 | Doshi | 55/16 |
| 4,654,047 | 3/1987 | Hopkins et al. | 62/23 |
| 4,654,063 | 3/1987 | Auvil et al. | 62/18 |
| 4,701,187 | 10/1987 | Choe et al. | 55/16 |

OTHER PUBLICATIONS

European Patent Publication 0335418 Published 10-4-89.
"Membranes Set to Tackle Larger Separation Tasks", Chemical Engineering, Sep. 28, 1987, pp. 14, 15 and 17.
"Inert Gas Generation for Offshore Platforms", American Institute of Chemical Engineers, 1986 Spring Meeting, Apr., 1986, New Orleans.

Primary Examiner—Wayne A. Langel
Attorney, Agent, or Firm—Alvin H. Fritschler

[57] ABSTRACT

Membrane or pressure swing adsorption systems are used for air separation, with the crude nitrogen stream obtained thereby passing to a catalytic combustion system for reaction of residual oxygen with hydrogen to produce a high purity nitrogen product. Excess hydrogen in the nitrogen product is minimized by controlling the amount of hydrogen employed based on the instantaneous crude nitrogen flow and purity, and adjusting hydrogen ingestion in response to nitrogen product purity feedback. Plant flow rate tracking control limits maximum rates of flow change to ensure stable operation.

16 Claims, 1 Drawing Sheet

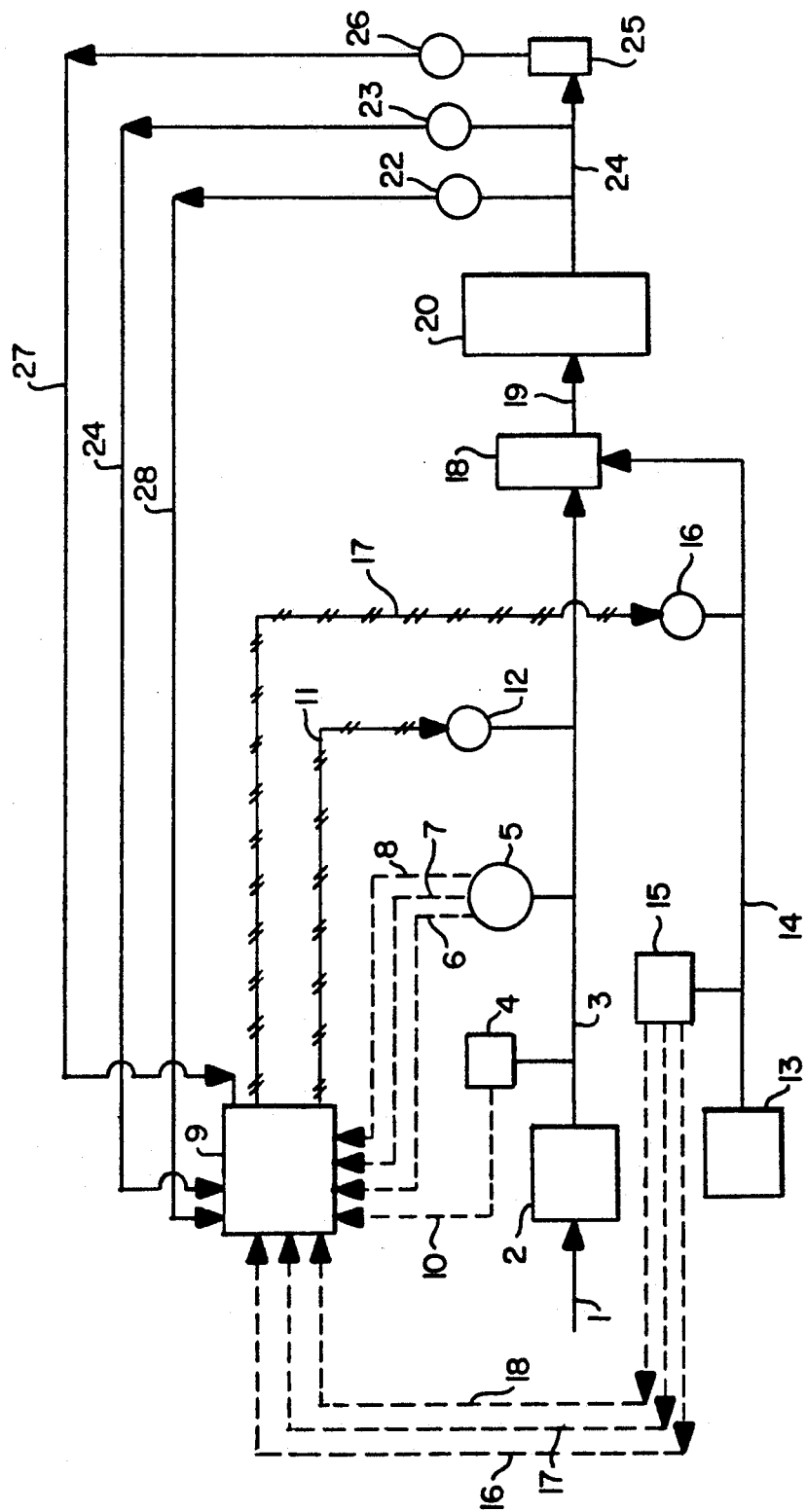

MEMBRANE/DEOXO CONTROL METHOD AND SYSTEM

BACKGROUND OF THE INVENTION

1. Field of the Invention

The invention relates to the production of nitrogen. More particularly, it relates to a membrane utilizing process and system for the production of low cost, high purity nitrogen.

2. Description of the Prior Art

The production of high purity nitrogen has, for many years, been carried out employing state-of-the-art air separation technology based on cryogenic distillation techniques. Because of the favorable economics of scale-up for such cryogenic distillation, large tonnage nitrogen users are supplied with nitrogen gas piped from a cryogenic plant installed on the users' site. Smaller tonnage users, i.e., 2-30 tons/day or less, are typically supplied with liquid nitrogen trucked to the users' site from a centrally located liquid nitrogen production plant. The cost of liquefying nitrogen gas and of transporting the liquid nitrogen from an off-site cryogenic plant to the users' site will be seen to add significantly to the cost of the nitrogen as supplied to the user.

In recent years, therefore, a major challenge in the art has been to develop small tonnage air separation plants that can effectively produce low cost nitrogen gas at the users' site. Recent developments relating to pressure swing adsorption (PSA) and membrane technologies have served to significantly lower the cost of on-site systems for the production of low purity, small tonnage nitrogen. On the other hand, high purity nitrogen cannot be economically produced by such PSA or membrane systems because of practical limitations rendering the power requirements and the cost of such systems prohibitive.

There is a desire in the art for the development of membrane or PSA systems and approaches capable of reducing the cost of on-site, high purity nitrogen. One approach that has been employed to reduce the cost of said on-site, high purity nitrogen involves the use of a membrane or PSA system coupled with a trace oxygen removal system for final purification of the nitrogen product. In this approach, a membrane or PSA system is used for initial air separation to produce nitrogen with about 1,000 ppm up to about 50,000 ppm of oxygen. A catalyst system, e.g. a Deoxo system, is then used to remove additional oxygen to produce a purified nitrogen product stream having a residual oxygen content of 10 ppm or less. While this approach enables high purity nitrogen to be produced on-site at a lower cost than by membrane or PSA systems alone, the cost saving achieved thereby nevertheless represents only a marginal improvement over that associated with the supply of liquid nitrogen by truck to the users' site. This is primarily due to the relatively high cost of the hydrogen required to react with the oxygen present in the partially purified nitrogen stream for a removal thereof. This approach could be of more practical commercial significance as compared to the trucking of liquid nitrogen, however, if a low cost hydrogen supply source and more efficient means of utilizing hydrogen were available at the users' site.

There are presently a number of industrial applications, particularly in the petrochemical industry, which require high purity nitrogen and that also have low cost hydrogen available on site. Frequently, however, this low cost, available hydrogen is impure and contains various hydrocarbons. As the use of such impure hydrogen would be disadvantageous with respect to the operation of a catalyst system for final nitrogen purification, such impure hydrogen is purified, and the resulting high purity hydrogen is used in an efficient and effective manner in said catalyst system for final, on-site nitrogen purification.

The inherent simplicity of permeable membrane systems provides a strong incentive and desire in the art for the development of such systems and related processes for the on-site production of high purity nitrogen. Those skilled in the art will also appreciate that there are particular overall processing operations for which an on-site PSA system is more appropriate than a membrane system, despite the inherent simplicity of membrane systems. The desire in the art for improved overall membrane and PSA systems for on-site, high purity nitrogen production will thus be seen as involving, in approaches utilizing a catalyst system for final nitrogen production, the development of means to effectively utilize hydrogen in the Production of nitrogen in a commercially feasible and efficient manner.

In cryogenic air system operations, a Deoxo system can be used to catalytically remove oxygen from an inert gas (argon) stream. When hydrogen is added to a crude argon stream containing any quantity of oxygen, the hydrogen and oxygen will combine to produce water as said mixture passes over a palladium catalyst. Typical systems operate at relatively constant flows and oxygen concentrations. Hydrogen control is not critical since excess hydrogen is easily removed after the crude argon stream is refined in the Deoxo system and subsequently recondensed. Such a system is typically operated with 1% (10,000 ppm) to 2% (20,000 ppm) "excess" hydrogen concentration above the stoichiometric ratio required for complete oxygen removal.

In the operation of a non-cryogenic (i.e. membrane or PSA) Deoxo system for the separation of nitrogen from air and the purification thereof, the high purity nitrogen produced generally contains less than 5 ppm oxygen, typically less than 1 ppm. While it is desirable that minimal quantities of excess hydrogen be present in said high purity product, no cost effective means have been available to essentially totally remove residual hydrogen from the final high purity nitrogen product, as in the cryogenic processing operations referred to above. There is a need in the art, therefore, to develop means so that the desired quantity of hydrogen for use in the Deoxo system reaction can be accurately introduced into said Deoxo system so that minimal excess hydrogen will be present in the high purity nitrogen product.

It is an object of the invention, therefore, to provide an improved system and process for the production of on-site, high purity nitrogen.

It is another object of the invention to provide an improved overall system and process, utilizing membrane or PSA systems for such on-site, high purity nitrogen production.

It is a further object of the invention to provide a process and system for the non-cryogenic separation of air and the production of high purity nitrogen product containing minimal quantities of excess hydrogen.

With these and other objects in mind, the invention is hereinafter described in detail, the novel features thereof being particularly pointed out in the appended claims.

SUMMARY OF THE INVENTION

The invention utilizes an improved membrane/-Deoxo control system and process that combines feed-forward and feedback control of the addition of hydrogen for fast response to changing operating conditions. Excess hydrogen in the high purity nitrogen product is minimized thereby.

BRIEF DESCRIPTION OF THE INVENTION

The invention is hereinafter further described with reference to the accompanying single FIGURE schematic diagram of an embodiment of the invention.

DETAILED DESCRIPTION OF THE INVENTION

The objects of the invention are accomplished by means of a novel control system and process that utilizes a "forward looking" control system that measures membrane or PSA nitrogen flow and purity, with the amount of hydrogen to be injected into the Deoxo system being automatically controlled based on the instantaneous membrane or PSA nitrogen flow and purity. A nitrogen product purity feedback signal is also employed to correct the hydrogen injection rate if it moves outside pre-set limits. This feedback adjustment controls minor modifications for the hydrogen injection rate over time periods of several minutes. This closed loop feedback automatically compensates for minor errors in flow and/or oxygen purity measurements. In addition, plant load trucking capabilities are provided to maintain tight purity controls over wide ranges of plant flow conditions.

The invention enables the integration of a non-cryogenic air separation system, membrane or PSA, to produce crude nitrogen, and a Deoxo system to purify or refine said nitrogen, while minimizing the "excess" hydrogen present in the high purity nitrogen product. Such high purity nitrogen is produced in the practice of the invention over a wide range of flows and oxygen purities, while maintaining minimal "excess" hydrogen in the range of 0.05% (500 ppm) to 0.1% (1,000 ppm). As noted above, the residual oxygen content of said high purity nitrogen is generally less than 5 ppm, typically less than 1 ppm.

With reference to the drawing, inlet line 1 is used to deliver feed air to non-cryogenic air separation system 2, which may be a permeable membrane system or a PSA system, capable of producing a crude nitrogen stream, typically at a pressure in the range of about 100-150 psig. The crude nitrogen gas stream removed from the air separation system through line 3 typically contains oxygen at a concentration of approximately 1-3%. Conventional oxygen analyzer 4 is used to measure oxygen purity. The oxygen analysis is continuous, with minimal sample and analyzer response delays, so that oxygen concentration or purity variations can be quickly measured. The crude membrane or PSA nitrogen flow is measured with orifice flow meter instrumentation means 5 that determines orifice differential pressure, actual line pressure and nitrogen gas temperature. Instrumentation means 5 is adapted to send corresponding signals, represented generally by the numerals 6, 7 and 8, respectively, to computer control system 9. Oxygen analyzer 4 is also adapted to send an input oxygen purity signal, represented by the numeral 10, to said computer control system 9.

Computer control system 9 is programmed to send an output signal, represented by the number 11, to automatic control valve 12 based upon the calculation of the crude nitrogen flow rate. Control valve 12 is thus modulated by the computer control system to limit the maximum gas flow rate desired and to turn down the plant flow rate in the event nitrogen gas demand is reduced.

Hydrogen gas for the Deoxo reaction is furnished by hydrogen gas supply means. Such gas can be supplied from two sources. A liquid hydrogen storage tank and related vaporizer equipment can be used, or a gaseous hydrogen source from a suitable gas supply storage, or other available means to supply hydrogen for use in the Deoxo reaction can be employed. The source of hydrogen supply and the means employed for purifying low cost hydrogen available in impure form at a particular job site, are not a part of the invention herein described and claimed. Computer control system 9 is programmed to determine the theoretical required hydrogen flow rate based on the instantaneous crude nitrogen flow rate from the membrane or PSA system and the oxygen concentration thereof. As is well known in the art, two volumes of hydrogen are required for each volume of residual oxygen to be reacted. The flow rate of the hydrogen delivered for use in the practice of the invention through line 14 is measured by orifice flow meter instrumentation means 15, which sends output signals 16, 17 and 18, representing the orifice differential pressure, actual line pressure, and hydrogen gas temperature, respectively, to computer control system 9. Said computer control system 9 is programmed to calculate the hydrogen flow rate and to modulate hydrogen flow control valve 16 by means of output signal 17 to maintain the actual hydrogen flow rate equal to the theoretical required hydrogen flow for reaction with the residual oxygen present in the crude nitrogen stream being passed from the non-cryogenic air separation system.

Crude nitrogen from line 3 and hydrogen from line 14 are conveniently combined in mixing chamber 18 and are passed therefrom in line 19 to downstream Deoxo vessel 20, which contains a palladium catalyst for the reaction of said hydrogen with oxygen present in said crude nitrogen stream to produce water. A purified nitrogen gas stream is withdrawn from said Deoxo vessel 20 through line 21 for recovery as high purity, essentially oxygen-free nitrogen product. A slight amount of excess hydrogen is desirably added to the crude nitrogen stream in mixing chamber 18 to ensure complete oxygen removal. Such "excess" hydrogen serves as a buffer to ensure complete oxygen removal during crude nitrogen gas stream flow and/or purity changes. As noted above, the amount of excess hydrogen in the purified nitrogen product stream will typically vary from about 500 ppm to about 1,000 ppm.

After the refined or purified nitrogen gas stream passes from Deoxo vessel 20, it is cooled and dried (not shown), and refined nitrogen gas purity is continuously monitored by means of trace oxygen analyzer 22 and hydrogen analyzer 23. The input signal 24 from hydrogen analyzer 23 to computer control system 9, along with input signal 28 from trace oxygen analyzer 22, serves to initiate a variation of output signal 17 to adjust the hydrogen flow rate as needed. Whenever the refined nitrogen gas stream hydrogen concentration falls below 500 ppm, a control loop in computer control system 9 increases the volume of hydrogen addition slightly. If, on the other hand, the hydrogen concentration uses above 1,000 ppm, the control loop decreases the volume of hydrogen addition slightly. It will be understood that this control loop adjustment operates very slowly because of the hydrogen analyzer sample time and the system's purity residence time.

The feedback input signal 24 of hydrogen analyzer 23 also serves to cause an automatic correction for slight variances in the crude nitrogen or hydrogen gas stream flow and purity measurements. Conventional instrumentation signals tend to drift slightly over time, due to ambient temperature effects or limitations of the electronic equipment itself. Such changes typically occur slowly, which enables the hydrogen analyzer 23 feedback control loop to compensate for such variations.

In order to achieve close control of excess hydrogen, the system flow rates must be measured and controlled to within approximately ±1%. Because the plant operates at various flows, pressures, temperatures and purity levels, it will be appreciated that it is nearly impossible to ensure ±1% total error under all potential processing conditions. By means of hydrogen analyzer 23 feedback control 24 loop adjustment, such errors can be compensated for in the event that the refined nitrogen gas stream hydrogen purity falls outside of the 500–1,000 ppm window.

The refined nitrogen gas stream in line 21 is connected to a nitrogen pipeline system 25 that supplies gas to required use points. In preferred embodiments, the gas pressure in the pipeline is continuously monitored by means of pressure meter or transmitter 26, which is tied into and sends input signal 27 to computer control system 9 and is used to key the computer control loop that modulates the plant flow rate. When the pipeline pressure rises above a preset point, the plant flow rate is reduced, as by output signals 11 and 17 from computer control system 9 to nitrogen flow control valve 12 and hydrogen flow control valve 16, respectively. If the pipeline pressure falls below a preset point, the plant flow rate is increased. Because of the tight limits desired on pipeline excess nitrogen, the rate of product flow change is limited to approximately 2% per minute. This desirable feature of the invention can be used to ensure that the system's flows and pressures are stable and under control before further adjustments are made. In the event of a condition where the use rate decreases faster than the rate of plant flow turndown, the pipeline pressure rises to a level at which an automatic pipeline vent valve limits the maximum pressure in said pipeline. During this time, the plant flow is being reduced until the pipeline pressure decreases and the vent valve closes. In the event of a condition where the use rate increases above the plant flow rate, the pipeline pressure will decrease. The pressure decrease signals computer control system 9 to increase the plant flow rate approximately 2% per minute. Once the pipeline pressure is above a minimum level the plant flow is stabilized at that point. Flow rate changes are adjusted by the control logic to maintain the maximum rate of change to within ±2% to ensure that the refined nitrogen gas hydrogen concentration is desirably maintained between about 500 ppm and 1,000 ppm.

The membrane, PSA and catalytic combustion systems and processes employed in the practice of the invention will be understood to constitute, individually, well known, commercially available technologies. By the unique combination of these technologies as herein disclosed and claimed, on-site production of high purity nitrogen as desired in the art is a practical commercial alternative to the use of liquid nitrogen trucked to a users' site from a centrally located liquid nitrogen plant for relatively smaller tonnage use at said site.

As is well known in the art, membrane systems are available in the art for selectively permeating a more readily permeable component of a feed gas mixture containing said component and a less readily adsorbable component. Any desired type of membrane, such as composite membranes, asymmetric membranes or any other form of membrane configuration, can be employed in the practice of the invention. Such membranes suitable for the air separation purposes of the invention generally comprise separation materials capable of selectively permeating oxygen as the more readily permeable component of air, with nitrogen as the less readily permeable component being recovered as a nitrogen-rich non-permeate gas. It is also within the scope of the invention, however, to employ a membrane system for initial nitrogen separation from air in which nitrogen is the more readily permeable component, an oxygen-rich gas stream is removed, and a nitrogen-rich gas stream is recovered as the permeate gas.

As noted above, PSA systems may also be desirable for air separation purposes in the practice of the invention, depending upon the particular requirements and operating conditions pertaining to a given high purity nitrogen production application. Those skilled in the art will appreciate that such PSA systems contain one or more beds of adsorbent material capable of selectively adsorbing a more readily adsorbable component of a feed gas mixture containing said component and a less readily adsorbable component. It will be understood that such PSA systems employ various processing cycles in which each bed, in sequence, generally undergoes an adsorption-desorption cycle in which the less readily adsorbable component is withdrawn from the bed during introduction of the feed gas mixture to the bed at upper adsorption pressure levels and in which the more readily adsorbable component is withdrawn from the bed during bed regeneration at lower desorption pressure. While PSA systems employed for air separation to recover nitrogen as the desired product generally employ adsorbent beds capable of selectively adsorbing oxygen as the more readily adsorbable component of air, it is also within the scope of the invention to employ PSA systems in which nitrogen is selectively adsorbed as the more readily adsorbable component. While PSA systems are known to generally involve a number of individual steps in the processing cycle carried out in each bed, the details of the PSA processing cycle employed in particular embodiments, e.g. pressure equalization, purge and repressurization steps, do not reach to the heart of the invention and need not be described in detail herein.

The catalytic combustion system and process employed in the practice of the embodiments of the invention, commonly known in the art as "Deoxo" systems, likewise comprises well known, established technology for further reducing the oxygen level of the partially purified nitrogen stream obtained by air separation in a membrane or PSA system. The Deoxo unit typically employs a noble metal catalyst, such as a platinum or a platinum-palladium catalyst, supported on an alumina substrate. The catalytic combustion nitrogen purification operation can thus be carried out in one or more catalytic stages employing a suitable, commercially available catalyst, capable of facilitating the removal of oxygen from the nitrogen stream being purified, down to a desired low level of residual oxygen content.

In the embodiments in which membranes are employed for the initial air separation operation, the oxygen content of the partially purified nitrogen stream will typically range from a lower level of about 1,000 ppm up to about 50,000 ppm, typically 10,000–30,000 ppm. The high purity nitrogen stream produced in the practice of the invention will have a residual oxygen content of less than about 5,000 ppm, with said residual oxygen content being less than about 5 ppm, typically less than 1 ppm, in particular embodiments of the invention. Reactant hydrogen will typically be purified to about 95+% hydrogen from any lower purity stream generally available at the users' site. The actual hydrogen purity limits employed in a particular application will generally vary depending on the users' final nitrogen product purity requirements. Those skilled in the art will appreciate that the invention can be advantageously employed with respect to high purity nitrogen production units of any size depending upon the various technical and economic factors pertaining to a given application, but that the invention will be particularly attractive, from an economic view point, for high purity nitrogen production units in the 5,000–50,000 cubic feet per hour range. The invention will be understood to be particularly valuable in refinery or other petrochemical facilities in which a ready source of low cost hydrogen is readily available and can be advantageously employed as a reactant in the final purification operation for the production of high purity nitrogen at an economically attractive cost. The practice of the convenient reactant purification operation, as herein described and claimed, enables such desired use of available low cost, impure hydrogen to be accomplished in a practical, commercially feasible manner.

Any impurities present in the hydrogen reactant stream, if not reacted in the catalyst system, will, of course, end up in the final nitrogen product stream. If the hydrogen reactant stream contains such impurities, in relatively large amounts, such impurities can have an adverse effect on the catalyst system, as well as resulting in the presence of an unacceptable level of impurities in the nitrogen product. It is for such reasons that it is desirable to use relatively high purity hydrogen, i.e., 95+%, in the catalyst system.

Those skilled in the art will appreciate that various changes and modifications can be made in the details of the invention without departing from the scope of the invention as set forth in the appended claims. Thus, the permeable membranes employed in the practice of the invention will commonly be employed in membrane assemblies typically Positioned within enclosures to form a membrane module comprising the principal element of a membrane system. As understood with reference to the invention, a membrane system comprises a membrane module or a number of such modules, arranged for either parallel or series operation. The membrane modules can be constructed in convenient hollow fiber form, or in spiral wound, pleated flat sheet membrane assemblies, or in any other desired configuration. Membrane modules are contracted to have a feed air-surface side and an opposite permeate gas exit side. For hollow fiber membranes, the feed air can be added either to the bore side or to the other surface side of the hollow fibers.

It will also be appreciated that the membrane material employed for the air separation membrane and for the hydrogen purification membrane can be any suitable material capable of selectively permeating a more readily permeable component of the feed gas, i.e., air or impure hydrogen. Cellulose derivatives, such as cellulose acetate, cellulose acetate butyrate and the like; polyamides and polyimides, including aryl polyamides and aryl polyimides; polysulfones; polystyrenes and the like, are representative of such materials. Composite membranes, such as ethyl cellulose on a polysulfone substrate, are convenient for many air separation and other applications as the material of the separation layer, which determines the separation characteristics of the composite, can be tailored to the particular performance requirements and operating conditions of a given application.

The PSA systems employed in the practice of the invention will typically comprise a number of adsorbent beds operated in accordance with processing cycles adapted to the number of beds actually employed, the applicable operating conditions and the desired performance requirements of a given application. The adsorbent material employed in each bed can be any suitable adsorbent material capable of selectively adsorbing a more readily adsorbable component of the feed air, while enabling the less readily adsorbable component of said feed air to be withdrawn from the bed. Zeolite molecular sieve materials, such as 5A and 13X material, are convenient adsorbent bed materials for the selective adsorption of nitrogen from feed air. Carbon molecular sieves, on the other hand, function in accordance with a different adsorption mechanism and, when used in air separation applications, result in the selective adsorption of oxygen as the more readily adsorbable component, with nitrogen being recovered as the less readily adsorbable component of feed air.

Those skilled in the art will appreciate that any well known, commercially available Deoxo catalyst can be used in the final nitrogen purification operation. As with membrane and PSA systems, one or more catalyst stages can be employed in achieving the desired reaction of oxygen present in the nitrogen stream being purified with hydrogen. As the reaction is exothermic in nature, suitable heat exchange means may be conveniently employed for efficient heat utilization in the reaction operation which generally occurs at a reaction temperature up to about 500° C.

The invention has been described herein with respect to on-site facilities. For purposes of the invention, such on-site facilities are typically deemed to denote the unique combination of separation and reaction systems as herein disclosed and claimed located at a convenient location on the users' site where high purity nitrogen is desired. The users' site should not be construed, however, as narrowly defining the property limits of a particular users' site. To the contrary, it is within the scope of the invention to position said on-site membrane, PSA or reaction systems over-the-fence or at some other convenient location in proximity to, but not on, the premises referred to in another context as the users' site. Any such convenient location is deemed to constitute on-site operation for purposes of the invention, as contrasted to a geographically regional liquid nitrogen plant that may be located at a convenient location for the region but many miles from the users' site, which is supplied with liquid nitrogen by truck from said regional location.

In light of the increasing need at refineries and other industrial locations for high purity nitrogen, as for blanketing, inerting or purging operations in which a low oxygen content is necessary or desirable for safety or product quality purposes, the invention provides a highly desirable process and system for satisfying such needs by convenient on-site capability at an economically feasible cost. The invention thus provides a significant advance in the art, one that further enlarges the ever-growing scope of application for the highly convenient and practical membrane technology and also, in particular applications, for the use of pressure swing adsorption technology in satisfying an important commercial need. By enabling such highly desirable operations to be carried out, while at the same time achieving minimal excess hydrogen content in the high purity nitrogen product stream, the invention enhances the commercial feasibility of employing the highly desirable and advantageous non-cryogenic air separation technologies, i.e. membrane and PSA technologies, in practical commercial, high purity nitrogen applications.

I claim:

1. An improved system for the production of high purity nitrogen comprising:
   (a) a membrane or pressure swing adsorption system capable of separating air into a partially purified nitrogen stream containing residual oxygen and an oxygen-rich discharge stream;
   (b) means for supplying feed air to such membrane or pressure swing adsorption system for separation therein;
   (c) a catalytic combustion system adapted for the reaction of the residual oxygen present in said partially purified nitrogen stream with a hydrogen stream;
   (d) means for passing a hydrogen stream to said catalytic combustion system;
   (e) means for passing the partially purified nitrogen stream from said membrane or pressure swing adsorption system to said catalytic combustion system;
   (f) oxygen analyzer means capable of continuously determining the oxygen purity of said partially purified nitrogen stream and of providing an input process variable signal proportional thereto;
   (g) flow meter means capable of determining the flow rate of said partially purified nitrogen stream and of providing an input process variable signal proportional thereto;
   (h) computer control means adapted for the sending of corresponding output control signals for control of the partially purified nitrogen stream flow rate in response to such input process variable signals, said computer control means also being adapted for sending of output control signals for control of the flow rate of said hydrogen stream so as to maintain the hydrogen flow corresponding to that required for reaction with the oxygen in the partially purified nitrogen stream with a minimal excess hydrogen content;
   (i) flow meter means capable of determining the flow rate of said hydrogen stream passing to said catalytic combustion system and of providing an input process variable signal to said computer control means proportional thereto;
   (j) control valve means for separately controlling the flow of partially purified nitrogen and of hydrogen to said catalytic combustion system, said valve means controlled in response to output signals from said computer control means;
   (k) conduit means for passing refined nitrogen product gas from said catalytic combustion system for downstream application;
   (l) analyzer means for determining the hydrogen content of said refined nitrogen product gas and for providing an input process variable signal proportional thereto to said computer control means for control of the hydrogen flow rate to said catalytic combustion means; whereby high purity nitrogen product can advantageously be produced with the hydrogen content of the refined nitrogen stream being minimized as a result of fast response to changing conditions in the overall system.

2. The system of claim 1 in which said air separation system comprises a membrane system.

3. The system of claim 1 in which said air separation system comprises a pressure swing adsorption system.

4. The system of claim 1 and including gas pressure monitoring means for determining the pressure of the refined nitrogen product gas from said computer control means, and for providing an input process variable signal proportional thereto to said computer control means.

5. The system of claim 1 in which said computer control means is adapted to maintain minimal excess hydrogen in the refined nitrogen product within the range of from about 500 ppm to about 1,000 ppm by the sending of output signals to said hydrogen control valve means in response to input process variable signals from said hydrogen content analyzer means.

6. The system of claim 1 and including gas pressure monitoring means for determining the pressure of the refined nitrogen product gas from said catalytic combustion system, and for providing an input process variable signal proportional thereto to said computer control means.

7. The system of claim 6 in which said computer control means is adapted to increase or decrease the refined nitrogen flow rate at a change in said flow rate not to exceed about ±2% per minute until a preset point is reached.

8. The system of claim 1 in which said system comprises an on-site system.

9. An improved process for the production of high purity nitrogen comprising:
   (a) passing feed air to a membrane or pressure swing adsorption system for separation therein into a partially purified nitrogen stream containing residual oxygen and an oxygen-rich discharge stream;
   (b) withdrawing a partially purified nitrogen stream containing residual oxygen and an oxygen-rich discharge stream from said air separation system;
   (c) passing said partially purified nitrogen and a hydrogen stream to a catalytic combustion system for reaction of the residual oxygen present in said partially purified nitrogen stream with said hydrogen to form water;
   (d) recovering a high purity, refined nitrogen stream from said catalytic combustion system, said high purity nitrogen having a desirably low residual oxygen content;
   (e) determining the oxygen purity of said partially purified nitrogen stream and providing an input process variable signal proportional thereto;
   (f) determining the flow rate of said partially purified nitrogen stream and providing an input process variable signal proportional thereto;

(g) sending said input signals to a computer control system adapted for the sending of corresponding output control signals for control of the flow rate of the partially purified nitrogen stream in response to said input process variable signals, and for sending of output control signals for the control of the flow rate of said hydrogen stream so as to maintain the hydrogen flow corresponding to that required for reaction with the oxygen in the partially purified nitrogen stream with a minimum excess hydrogen content;

(h) determining the flow rate of said hydrogen stream passing to said catalytic combustion system and providing an input process variable signal to said computer control means proportional thereto;

(i) separately controlling the flow rates of partially purified nitrogen and of hydrogen to said catalytic combustion system in response to output signals from said computer control means;

(j) determining the hydrogen content of said refined nitrogen product gas recovered from said catalytic combustion system and providing an input process variable signal proportional thereto to said computer control means for control of the hydrogen flow rate to said catalytic combustion means;

whereby high purity nitrogen product can advantageously be produced with the hydrogen content of the refined nitrogen stream being minimized as a result of fast response to changing conditions in the overall system.

10. The process of claim 9 in which said air separation system comprises a membrane system.

11. The process of claim 9 in which said air separation system comprises a pressure swing adsorption system.

12. The process of claim 9 and including determining the pressure of the refined nitrogen product gas from said computer control means, and providing an input process variable signal proportional thereto to said computer control means.

13. The process of claim 9 in which said computer control means is adapted to maintain minimal excess hydrogen in the refined nitrogen product within the range of from about 500 ppm to about 1,000 ppm by the sending of output signals to said nitrogen and hydrogen control valve means in response to input process variable signals corresponding to the hydrogen content of said refined nitrogen product gas.

14. The process of claim 9 and including determining the pressure of the refined nitrogen product gas from said catalytic combustion system, and providing an input process variable signal proportional thereto to said computer control means.

15. The process of claim 14 in which said computer control means is adapted to increase or decrease the refined nitrogen flow rate at a change in said flow rate not to exceed about ±2% per minute until a preset point is reached.

16. The process of claim 9 in which said high purity nitrogen process is carried out on-site.

* * * * *